US006218021B1

(12) United States Patent
Sobieski et al.

(10) Patent No.: US 6,218,021 B1
(45) Date of Patent: Apr. 17, 2001

(54) DIELECTRIC IMAGE RELEASE SURFACE CONTAINING A HIGH PERCENT SILICONE COMPOSITION AND USES THEREFOR

(75) Inventors: James F. Sobieski, Mahtomedi; Patricia J. A. Brandt, Woodbury; Thomas A. Speckhard, Cottage Grove, all of MN (US)

(73) Assignee: 3M Innovative Properties Company, St Paul, MN (US)

( * ) Notice: Subject to any disclaimer, the term of this patent is extended or adjusted under 35 U.S.C. 154(b) by 0 days.

(21) Appl. No.: 09/282,651

(22) Filed: Mar. 31, 1999

(51) Int. Cl.[7] .................................................... B32B 27/40

(52) U.S. Cl. ......................... 428/447; 156/230; 156/234; 156/240; 399/297; 399/310; 428/423.1; 428/448; 430/47; 430/48; 430/102; 430/126

(58) Field of Search .................................... 156/230, 234, 156/240; 430/47, 48, 102, 126; 428/447, 448, 423.1; 399/297, 310

(56) References Cited

U.S. PATENT DOCUMENTS

| | | | |
|---|---|---|---|
| 5,045,391 | 9/1991 | Brandt et al. | 428/336 |
| 5,106,710 | 4/1992 | Wang et al. | 430/42 |
| 5,114,520 | 5/1992 | Wang, Jr. et al. | 156/240 |
| 5,262,259 | 11/1993 | Chou et al. | 430/47 |
| 5,264,291 | 11/1993 | Shinozaki | 428/513 |
| 5,512,650 | 4/1996 | Leir et al. | 528/14 |
| 5,702,803 | 12/1997 | Eisele et al. | 428/195 |

FOREIGN PATENT DOCUMENTS

| | | | |
|---|---|---|---|
| 0 443 846 | 8/1991 | (EP) | G03G/5/147 |
| 0 437 073 | 7/1997 | (EP) | G03G/7/00 |

*Primary Examiner*—D. S. Nakarani
(74) *Attorney, Agent, or Firm*—Dale A. Bjorkman

(57) ABSTRACT

The present invention discloses a high weight percent of silicone within the silicone-urea block polymer for use with or as a dielectric layer material for electrostatic printing. The high weight percent comprises between about 66 and about 94 weight percent.

14 Claims, No Drawings

DIELECTRIC IMAGE RELEASE SURFACE CONTAINING A HIGH PERCENT SILICONE COMPOSITION AND USES THEREFOR

FIELD OF THE INVENTION

The present invention relates to image release and particularly, relates to release by use of silicone-urea block polymers in electrostatic imaging processes.

BACKGROUND OF INVENTION

The use of electrographic processes to produce images is well known. Electrography includes both electrostatic deposition of charge and electrophotography. In the former, an electrostatic charge is produced directly by "spraying" charge onto an accepting dielectric substrate in a controlled manner to generate a latent image graphic.

Styli or "needle electrodes" are often used to create these image patterns and are arranged in linear arrays across the width of the moving dielectric surface. As many as four or five arrays of styli can be used in a "single pass" printer such as those available from Minnesota Mining and Manufacturing Company (3M) of St. Paul, Minn., USA, or one array of styli can be used in a "multiple pass" printer such as those available from Xerox Corporation of Rochester, N.Y., USA.

The latent image electrostatically charged is then developed on the dielectric substrate with suitable toner(s). Usually, at least four colors, cyan, magenta, yellow, and black (CMYK) of toners are employed to generate a myriad of colors through overlapping of toners in any one area of the image. Resolution of images presently exists to 400 dots/inch (dpi).

If the image is developed onto image transfer media, such as 3M's 8601 media, the toner image can then be transferred to a durable substrate. The success of this transfer is supported by the incorporation of a release polymer within or on the dielectric substrate. The incorporation of such a release polymer onto the dielectric substrate increases the susceptibility to scraping or scratching marks due to handling of the toned dielectric substrate. Careful handling of the substrate containing the colorful toner image prior to image transfer is always required.

Scraping or scratching of the image is also a concern during the imaging process within the electrostatic printer, prior to exiting from the printer. The dielectric substrate can be in contact with various areas of the printer such as the styli array, developer rollers, drying rollers, vacuum channels or media transport devices. Physical contact with each of these devices can generate an image scrape of the previously developed toner image, especially if the previous toner color or colors are of high density and/or not thoroughly dried.

The probability for image scraping on image transfer media can be reduced by increase of the total surface roughness. Surface roughness can be measured in Sheffield units and total Sheffield readings above 90 Sheffield Units are preferred in order to minimize the probability of scraping.

Sheffield test procedures and measurements are well defined in TAPPI method T 538 om-88 titled "Smoothness of paper and paperboard (Sheffield method)" published in the year of 1988. Sheffield readings are reported as SCCM [Standard cubic centimeters per minute] or as SHEFFIELD UNITS. There is also an article by George A. Hagerty and John W. Walkinshaw tilted "The Sheffield unit Update to today's technology" published in the January 1988 issue of TAPPI Journal.

For purposes of disclosure of the present invention, the Sheffield Units were direct readings using the Sheffield instrument called Sheffield Surface Measurement Tester—made by Sheffield Measurement Precision Products commercially available from Testing Machines Inc. (TMI) of Amityville, N.Y. USA.

For purposes of the present invention, the term "total surface roughness" refers to reading of the total construction of the dielectric material, not just the roughness of the paper, dielectric layer, or other layers.

For the purposes of the present invention, the terms "scraping" and "scratching" are synonymous.

History has shown an increase in roughness will decrease scraping, but as the roughness is increased usually the transfer efficiency tends to decrease. Roughness is defined for purposes of the present invention as the measurement at the surface which is a total roughness measurement and is influenced by the composite (total) roughness of all the layers within the construction.

History has also demonstrated if a smooth base paper is used then compensation to achieve proper total surface roughness is accomplished by increasing the roughness of the dielectric layer.

In newer high speed electrostatic printers for producing large format full color graphics, such as the 3M Scotchprint™ 2000 System from 3M, image drying time is limited from deposition of one toner from a station to the next toner station(s) and there is concern related to image scraping prior to exiting the machine. Even with drying fans operating at maximum capacity, scraping can occur in high speed electrostatic printing systems, especially if more than 4 toner imaging stations exist, such as when a fifth imaging station for "spot colors" or alternative toner or coating compositions.

Sometimes, one desires to generate a black image that comprises all four colors, yielding a very high density of toner on a given area of the dielectric substrate. In the case of a solid four color black image, the printing speed of the system must be reduced to less than the maximum value in order to give more drying time, in order to minimize scraping of some of the printed surface at the fifth station. Alternatively, voltage contrast must be reduced in order to limit toner density. As a last resort, the fifth station must be removed from the printer.

Again, this concern related to scratching the image prior to exiting of either single pass or multiple pass printers arises from the incorporation of release polymer near the image surface of the dielectric substrate. After all, the deposition of that toned image is for transfer, but not prematurely through scraping within the printer itself.

SUMMARY OF INVENTION

The invention solves the problems of the art by providing an electrostatic media that contains a release polymer that withstands the rigors of electrostatic deposition within the printer and after printing, but smoothly and efficiently assists in the transfer of the toned image from the dielectric substrate to the durable substrate.

One aspect of the invention is an image release surface for dielectric substrates employing silicone-urea block polymers with a high weight percent silicone composition, which minimizes the problems of image scratching or scraping marks within the printer or after printing and before image transfer.

Another aspect of the present invention is a donor element for image transfer which contains a silicone-urea block polymer with a high weight percent silicone as a release material.

Another aspect of the present invention is the use of silicone-urea block polymers with a high weight percent of silicone is unexpectedly preferred as a formulation for toner imaging and release, in direct contrast to the disclosure contained in U.S. Pat. No. 5,045,391 (Brandt et al.), where a maximum of 65 weight percent of silicone (polydimethylsiloxane or "PDMS") was used in the silicone-urea block polymer. Preferably, Brandt et al. taught polymers having 10 weight percent PDMS, 75 weight percent dipiperidyl propane/isophorone diisocyanate ("DIPIP/IPDI"), and 15 weight percent polypropylene oxide with terminal diamine groups ("PPO"). The DIPIP/IPDI is the "hard" block or segment of the block polymer. The PDMS and PPO portions of the molecule form the "soft" blocks or segments. "Hard" and "soft" are terms of art to those skilled in the art of block polymerization without attempt to further characterize the level of hardness or softness. Additional information concerning the hard and soft block character of such block polymers can be found in various literature references, e.g., *Block Copolymers: Overview and Critical Survey,* (A. Noshay and J. E. McGrath, Academic Press, 1977, pp. 27–29).

Unexpectedly, the present invention has shown that image scraping is reduced, without sacrificing completeness of image transfer, by increasing the PDMS weight percent of the silicone-urea block polymer to a range of from at least 66 to about 94 weight percent. This restricts the hard segment of the polymer to a range of from 6 to about 34 weight percent. There is no loss of transfer efficiency for the higher weight percent silicone composition.

Optionally a non silicone soft segment, such as PPO, can also be added to the silicone-urea block polymer.

One feature of the present invention that the compositions of the present invention provide an increase in scratch resistance for the toned dielectric substrate in spite of the reduction in hard blocks in the composition.

An advantage of the present invention is increased efficient usage of larger, faster electrostatic printers now emerging in the image graphics market.

Unlike the prior constructions of dielectric substrates, which increased roughness to reduce scratching, the compositions of the present invention can also be used on papers that are not as rough, and there is now no need for adding extra roughness in the dielectric layer or the total surface roughness.

Thus another advantage of the present invention is the use of a combination of the compositions of the present invention with smooth conductive base paper to provide a superior performing dielectric substrate having an increase in toning speeds and an increase in image transfer speed.

The embodiments of the invention will reveal other features and advantages.

EMBODIMENTS OF INVENTION

Silicone-Urea Block Polymers with a High Weight Percent Silicone

The silicone-urea block polymers used in the release layer of the present invention are prepared by mixing under reactive conditions an organopolysiloxane diamine, a diisocyanate, a short chain diamine chain extender, and, optionally, a polymeric or oligomeric diamine chain extender. These reactive conditions are described in U.S. Pat. No. 5,512,650 (Leir et al.), incorporated herein by reference.

The silicone-urea block polymers obtained from these starting materials possess a multi-phase polymer architecture composed of hard blocks and soft blocks. The hard blocks are derived from the combined content of the diisocyanate and short chain diamine chain extender components of the block polymer, while the soft blocks result from the organopolysiloxane diamine and optional polymeric or oligomeric diamine chain extender. See also *Block Copolymers: Overview and Critical Survey,* (A. Noshay and J. E. McGrath, Academic Press, 1977, pp. 27–29).

The hard block content of the block polymer can range from about 6 to about 34 weight percent and preferably from about 15 to about 34 weight percent. Suitable diisocyanate components of the hard block include toluene diisocyanate, hexamethylene diisocyanate, 4,4'-methylene-bis-phenylisocyanate (MDI), 4,4'-methylene-bis (cyclohexyl) diisocyanate (H-MDI), isophorone diisocyanate (IPDI), and the like. Of these, isophorone diisocyanate (IPDI) is preferred and commercially available from Bayer of Pittsburgh, Pa., USA. Suitable short chain diamine chain extender component of the hard block include hexamethylene diamine, xylylene diamine, 1,3-di(4-piperidyl)propane (DIPIP), piperizine, 1,3-diaminopentane (Dytek™ EP, commercially available from DuPont of Wilmington, Del., USA), 2-methyl-1,5-pentanediamine, and the like, with 1,3-diaminopentane being preferred.

The soft block content of block polymer can range from about 66 to about 94 weight percent and preferably from about 66 to about 85 weight percent. The soft block is either totally or predominantly derived from the organopolysiloxane diamine component of the block polymer. Useful organopolysiloxane diamines are available commercially, but are preferably prepared according to the methods described U.S. Pat. No. 5,512,650 (Leir et al.), incorporated herein by reference. The organopolysiloxanes diamines provide the high weight percent "silicone" or "PDMS" content to the silicone-urea block polymers of the release layers of the present invention.

As stated above, a polymeric or oligomeric diamine chain extender can also be incorporated into the block polymer and contributes to the soft block content of the block polymer. When used, the polymeric or oligomeric diamine chain extender can range from about 0 to about 29 weight percent of the block polymer, preferably about 0 to about 15. Useful polymeric diamine chain extenders include diamine terminated polyalkylene oxides such as polytetramethylene oxide diamines, polyethylene oxide diamines, polypropylene oxide diamines ("PPO"), and the like. Preferably, polypropylene oxide diamines or "PPO" such as those available from Huntsman Chemical Co. of Salt Lake City, USA under the trade name "Jeffamine" can be used.

Method of Making Silicone-Urea Block Polymers with a High Weight Percent Silicone The method of polymerizing block polymers of the present invention is disclosed in U.S. Pat. No. 5,045,391 (Brandt et al.), the disclosure of which is incorporated herein by reference, except that the weight percentages of the hard blocks and soft blocks are altered according to the present invention.

Method of Using Silicone-Urea Block Polymers with a High Weight Percent Silicone The method of coating block polymers of the present on dielectric substrates is also disclosed in U.S. Pat No. 5,045,391 (Brandt et al.), the disclosure of which is incorporated herein by reference, except that one can choose among three different locations for the block polymer as a release coating:

(a) As the uppermost, exposed major surface of the dielectric substrate, as disclosed in U.S. Pat. No. 5,045,391 (Brandt et al.) incorporated by reference herein;

(b) As integral with a dielectric layer that is the uppermost, exposed major surface of the substrate, as disclosed in U.S. Pat. No. 5,702,803 (Eisele et al.), incorporated by reference herein; and (c) As an underlayer of the dielectric substrate, as disclosed most clearly in U.S. Pat. No. 5,264,291 (Shinozaki), incorporated by reference herein.

Each of these locations can employ a coating technique known to those skilled in the art and recited in the applicable document. Regardless of the location, the silicone-urea block polymer with a high weight percent silicone serves as a release layer which permits transfer of the colorful toned image from the dielectric substrate to the durable substrate. The location of that block polymer layer on the dielectric substrate is a matter of choice to one skilled in the art and enhances the versatility of the compositions of the present invention.

Usefulness of the Invention

With block polymers of the present invention residing in a layer in or on a dielectric substrate, one can use such electrostatic media for the developing of a colorful, toned, electrostatic image as is well described in U.S. Pat. No. 5,262,259 (Chou et al.), the disclosure of which is incorporated herein by reference. The uses of a silicone-containing dielectric substrate as an electrostatic medium, i.e., an image donor element, and the release/transfer of the image from that medium to a receiving durable substrate is described in U.S. Pat. Nos. 5,045,391 (Brandt et al.) and 5,106,710 (Wang et al.), the disclosures of which are incorporated by reference herein.

Release layers on the exposed surface of the dielectric substrate have been found to be unexpectedly scrape resistant. The releasable image in this invention, when in contact with the high weight percent of PDMS in the silicone-urea block polymer, was found surprisingly to be more scrape resistant. One skilled in the art would have expected that high weight percent of silicone would decrease surface energy and reduce toner adhesion, thereby increasing scraping. One skilled in the art could have expected that the soft (more rubbery) surface imaging material and the imaged product, also being a soft surface image, would produce a poor quality transferred image due to the high heat and pressure of the transfer laminator upon the soft material. Surprisingly, the image transfer efficiency was not affected. Moreover, and especially unexpectedly, images transferred to durable substrates were as crisp as images from the conventional silicone-urea block polymers with low weight percent silicone disclosed previously.

The images produced with dielectric substrates having silicone-urea block polymer with high weight percent silicone when dried were much less susceptible to scraping before transferring. The possibilities of damaging an image during electrostatic printing or during handling after printing and before transfer are significantly reduced. With the faster printers now in the work place, scrape resistance becomes a significant feature of the present invention because there is decreased drying time in the printer itself.

Image quality and media handling are improved without any increase in surface roughness required. The dielectric substrate can have a surface roughness ranging from about 80 to about 140 and preferably from about 100 to about 130 Sheffield units.

Image density of the transferred image onto the durable substrate is slightly lower using the silicone-urea block polymers of the present invention as release layer(s) but is more than compensated by the improved image graphic printing and handling features discussed above.

The embodiments are further revealed in the following examples:

EXAMPLES

Example No. 1

Silicone urea block polymer, containing 79 weight percent of 5000 Mn PDMS;

1 weight percent of Jeffamine® D-4000 PPO monomer; and 20 weight percent hard segment comprising Dytek™EP monomer and IPDI monomer, was prepared by the same process as disclosed in U.S. Pat. No. 5,045,391 and then coated on a 137 cm (54 inch) wide web of electrostatic dielectric coated media with the same construction as 3M No. 8610 imaging paper but adjusted for increased surface roughness.

To test the example, an image was developed at maximum speed (10 ft/min) and contrast voltage (600 volts) in a 3M Scotchprint™ 2000 System, a single pass, four color electrostatic printer. These conditions for imaging, which are considered one of the most strenuous for potential scratching possible, resulted in no perceptible scraping of the image plus excellent image quality upon heat transfer in an Orca III laminator (GBC ProTech of DeForest, Wis., USA) as disclosed in U.S. Pat. No. 5,114,520 (Wang et al.) to vinyl material (3M Scotchcal™8620 (ES) media), with a small difference of transferred image background density as compared with transferred images produced using 3M 8601 Image Transfer Media that contains a lower weight percent (<66%) PDMS in the block polymer.

Comparison Example A

Silicone-urea polymer was produced following Example 1 in U.S. Pat. No. 5,045,391 with 10 weight percent of 5000 Mn PDMS; 15 weight percent of PPO Jeffamine®(DU-700) and 75 weight percent of DIPIP/IPDI and coated and imaged the same as in Example No. 1 above. Scraping was prevalent and regrettably unavoidable.

Table 1 shows the comparison of optical density results for Example 1 and Comparison Example A applying measurements for black, magenta, cyan and yellow; and Delta E ($\Delta E$) background readings. Optical density readings were taken using GRETAG Type SPM 50 LT CH-8105 made and sold by Gretag Limited, Regensdorf, Switzerland.

TABLE 1

| | Optical Density | | | | |
|---|---|---|---|---|---|
| Example | Black | Magenta | Cyan | Yellow | ($\Delta E$) |
| 1 | 1.42 | 1.35 | 1.27 | 0.92 | 1.33 |
| A | 1.44 | 1.40 | 1.39 | 0.98 | 1.14 |

($\Delta E$ readings relate to toner deposition, where the greater the color shift, the higher the $\Delta E$ number. The amount of toner is measured on the nonimaged areas or the areas of white where toner is not wanted or not expected to be deposited. Readings are taken after setting the zero reading using plain untoned paper. In other words, lack of any toner on the white imaging substrate is a $\Delta E$ reading of zero with a target being less than 2 after transfer.)

($\Delta E$ readings relate to toner deposition, where the greater the color shift, the higher the $\Delta E$ number. The amount of toner is measured on the nonimaged areas or the areas of white where toner is not wanted or not expected to be deposited. Readings are taken after setting the zero reading using plain untoned paper. In other words, lack of any toner on the white imaging substrate is a ΔE reading of zero with a target being less than 2 after transfer.)

Examples No. 2a–c and Comparison Examples B–C

A series of silicone urea block polymers were prepared, following the general synthetic procedures in U.S. Pat. No. 5,054,391 from the 5000 Mn PDMS diamine monomer (prepared following U.S. Pat. No. 5,512,650, the disclosure of which is incorporated by reference herein), using diaminopentane chain extender Dytek™EP (from DuPont of Wilmington, Del., USA) and isophorone diisocyanate (IPDI) (from Bayer of Pittsburgh, Pa.) to form a Dytek™EP/IPDI as the hard segment, and Jeffamine® D-400 (Huntsman Chemical of Salt Lake City, Utah, USA) as the non-silicone soft segment.

The ratios, in weight percent, varied as follows:

| Sample No. | PDMS | PPO (Jeffamine ® D-400) | Dytek ™ EP/IPDI |
|---|---|---|---|
| 2a | 72.1 | 0.1 | 27.7 |
| 2b | 74.5 | 11.5 | 14.1 |
| 2c | 77.4 | 3.6 | 19.0 |
| B | 57.7 | 8.9 | 33.5 |
| C | 25.0 | 0.0 | 75.0 |

The above Examples were prepared at 15% solids in isopropyl alcohol and coated and dried to provide an image release layer as the top layer of a dielectric substrate. All were imaged on a 3M Model 9510 electrostatic printer. All Examples had excellent scratch resistance to light abrasion. A hand fingernail scratch qualitative (visual inspection) test was used: on a scale of 1–10 with 10=no scratch, gave estimated average values of 6.0, 7.5, 5.5, 4.0 and 1.0 for Examples 2a, 2b, and 2c, B and C respectively.

These results mean that scratch resistance improves substantially as hard block content is reduced to about 34% or lower. Soft block content is preferably 66% or above for good scratch resistance. Scratch resistance on the above "ratios" chart start to show improved resistance in the B example and greater resistance working towards the 2a, with the C as the worst case of resistance.

Example 3 and Comparison Examples D–H

A series of silicone-urea polymers were prepared from the 5000 Mn PDMS diamine monomer (prepared following U.S. Pat. No. 5,512,650 as above) using diaminopentane chain extender and isophorone diisocyanate (Dytek™EP/IPDI) as the hard block. No PPO monomer was used. The weight ratio of PDMS monomer to Dytek™EP/IPDI monomer was varied as follows

| Sample | PDMS | Dytek ™ EP/IPDI |
|---|---|---|
| D | 5 | 95 |
| E | 25 | 75 |
| F | 45 | 55 |
| G | 65 | 35 |
| 3 | 85 | 15 |
| H | 95 | 5 |

The above Examples were prepared at 15% solids in isopropyl alcohol following the general synthetic procedures in U.S. Pat. No. 5,045,391 and coated and dried to provide an image release layer as the top layer of a dielectric imaging element, except in this case it was coated and dried as the surface layer on direct electrostatic imaging paper (3M 8610 media), and then imaged on a 3M Model 9510 electrostatic printer. Black, magenta, cyan and yellow densities are listed along with background values (ΔE) for each Example. The 95% PDMS Example had higher background and lower cyan and yellow densities which is less desirable. All other Examples had acceptable image density and background values. Only the three highest weight percent PDMS Examples had excellent resistance to scratching of the toner from the surface of the imaged media before transfer of said image. All Examples, except the 95% PDMS which had lower transfer quality of transfer in relationship to all the other Examples, exhibited the same acceptable level of transfer to 3M Marking Film No. 8620 using a hot roll laminator as described in U.S. Pat. No. 5,114,520.

The following table shows the optical density (OD) readings for this range of concentrations of soft blocks.

TABLE 3

| Optical Densities | | | | | | | |
|---|---|---|---|---|---|---|---|
| Ex. | Target | B | C | D | E | 3 | F |
| % Wt. PDMS | 66–94 | 5 | 25 | 45 | 65 | 85 | 95 |
| Cyan | 1.35 | 1.36 | 1.35 | 1.35 | 1.23 | 1.29 | 1.05 |
| Magenta | 1.40 | 1.38 | 1.38 | 1.40 | 1.37 | 1.39 | 1.31 |
| Yellow | 0.95 | 0.95 | 0.95 | 0.95 | 0.94 | 0.84 | 0.69 |
| Black | 1.45 | 1.46 | 1.45 | 1.46 | 1.43 | 1.44 | 1.36 |
| ΔE | <2 | 2.89 | 0.51 | 0.72 | 0.88 | 1.62 | 11.3 |

The target Optical Densities for each color are different because of experiences in the printing industries for the achievement of versatile formation of a variety of colors using the subtractive colors of Cyan, Magenta, and Yellow, along with Black.

Example No. 4

In this example, a silicone-urea block polymer was coated on a conductive DR base (from Otis Specialty Papers, Inc.; Maine, USA) and used by itself as the dielectric layer, i.e., as an integral release/dielectric layer according to option (b) above. In order for the imaging process to function properly in an electrostatic imaging system, the dielectric surface must be rough and slightly abrasive. The roughness determines the average distance between the styli array and the dielectric surface. A suitable gap is needed for proper deposition of electrostatic charge onto the surface of the dielectric layer from the styli on the write head of the printer. In this example, calcium carbonate with an average particle diameter of 3 $\mu$m was used as pigment to provide the suitable roughness.

Calcium carbonate pigment was milled with glass milling balls for one hour in isopropyl alcohol at 68% solids. This calcium carbonate dispersion was added to a 15% solids solution of silicone-urea block polymer 75:25 (PDMS: Dytek™EP/IPDI) in isopropyl alcohol to make a pigment binder ratio of 0.95 to 1.0. Isopropanol was adjusted to make final solids of 20%. The dispersion was coated on a knife coater on a 30 cm (12 inch) wide conductive paper base made by Otis Specialty Papers at 0.05 mm (2 mils) wet coating thickness, air dried overnight, and imaged on a modified 3M 9510 printer with a 28 cm (11 inch) vacuum channel. An acceptable four color image was obtained. Transfer was made to 3M No. 8620 Electrostatic Marking Film using a hot roll laminator at 96° C. (205° F.). Excellent transfer was obtained. Table 4 shows the optical densities obtained.

Example No. 5

In this example, a dispersion of milled calcium carbonate (Atomite available from ECC America) at 68% solids in isopropyl alcohol was added to a 15% solids solution of Butvar B98 polyvinyl butyral (available from Monsanto Co.) to make a pigment to binder ration of 0.95 to 1.0 This dispersion (calcium carbonate/Butvar) was blended with equal parts of the corresponding dispersion from example 3 (silicone-urea block polymer: calcium carbonate) and diluted with isopropyl alcohol to produce a 20% solids solution with pigment to binder ration of 0.95 to 1.0 where 50% of the binder was silicone urea polymer and 50% was polyvinyl butvar. The material was coated, imaged and transferred in the same manner as Example no. 4. Excellent transfer of the developed image was obtained using transfer conditions same as Example No. 4.

TABLE 4

| | Optical Densities | | | | |
|---|---|---|---|---|---|
| Ex. | Cyan | Magenta | Yellow | Black | ΔE |
| 4 | 1.00 | 0.93 | 0.64 | 1.16 | 1.61 |
| 5 | 1.14 | 1.15 | 0.67 | 1.3 | 1.79 |

The invention is not limited to these embodiments. The claims follow.

What is claimed is:

1. An electrostatic printing medium comprising:

a substrate having dielectric properties and a release layers said release layer comprising a silicone-urea block polymer, wherein the polymer comprises a silicone weight percent ranging from at least 66 to about 94.

2. The medium of claim 1 further comprising an exposed dielectric layer, wherein the dielectric properties are provided by the exposed dielectric layer on a major surface of the substrate and wherein the release layer is under the dielectric layer.

3. The medium of claim 1 further comprising a dielectric layer, wherein the dielectric properties are provided by the dielectric layer and wherein the release layer is exposed on a major surface of the substrate above the dielectric layer.

4. The medium of claim 1, wherein the dielectric properties are provided within the release layer.

5. The medium of claim 4, further comprising calcium carbonate pigment in the release layer.

6. The medium of claim 1, wherein the release layer further comprises polypropylene oxide with terminal diamine groups.

7. A method of using an electrostatic printing medium, comprising the steps of:

(a) placing the electrostatic printing medium of claim 1 in an electrostatic printer;

(b) printing an image on the medium using electrostatic charges and toner; and (c ) transferring the image from the medium to a durable substrate.

8. The method of claim 7, wherein the medium comprises a medium of claim 2.

9. The method of claim 8, wherein the medium comprises a medium of claim 3.

10. The method of claim 8, wherein the medium comprises a medium of claim 4.

11. The method of claim 8, wherein the medium comprises a medium of claim 6.

12. The method of claim 8, wherein the medium comprises a medium of claim 7.

13. An electrostatic printing medium comprising:

a substrate having dielectric properties; and a release layer, wherein the release layer comprises a silicone-urea block polymer having a hard block comprising 1,3-diaminopentane and isophorone diisocyanate, and the polymer comprises a silicone weight percent ranging from about 66 to about 94.

14. A method of using an electrostatic printing medium, comprising:

(a) placing in an electrostatic printer the electrostatic printing medium, wherein the medium comprises a substrate having dielectric properties and a release layer, the release layer comprises a silicone-urea block polymer having a hard block comprising 1,3-diaminopentane and isophorone diisocyanate, and the polymer comprises a silicone weight percent ranging from about 66 to about 94;

(b) printing an image on the medium using electrostatic charges and toner; and (c) transferring the image from the medium to a durable substrate.

* * * * *

UNITED STATES PATENT AND TRADEMARK OFFICE

CERTIFICATE OF CORRECTION

PATENT NO. : 6,218,021 B1 
DATED : April 17, 2001
INVENTOR(S) : James F. Sobieski et al.

It is certified that error appears in the above-identified patent and that said Letters Patent is hereby corrected as shown below:

<u>Column 6, line 62, through column 7, line 2,</u>
Delete this paragraph, as it is already printed immediately after Table 1.

<u>Column 9,</u>
Line 30, "layers" should read -- layer, --.

<u>Column 10,</u>
Lines 15, 17, 19 and 21, "claim 8" should read -- claim 7 --.
Line 22, "claim 7" should read -- claim 5 --.

Signed and Sealed this

Twenty-fifth Day of June, 2002

*Attest:*

JAMES E. ROGAN

*Attesting Officer* *Director of the United States Patent and Trademark Office*